Dec. 5, 1961    B. RAISTRICK    3,011,876
APPARATUS FOR GRANULATING FERTILIZER
Filed July 2, 1957    2 Sheets-Sheet 2
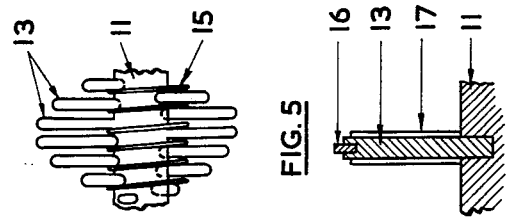
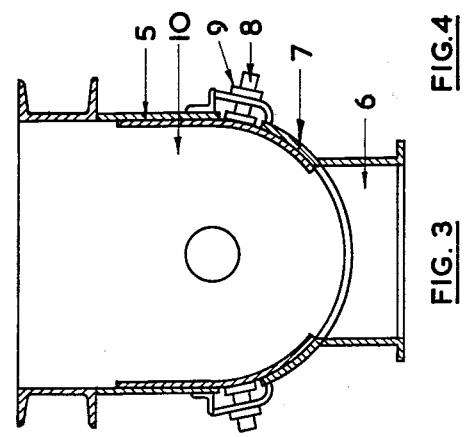
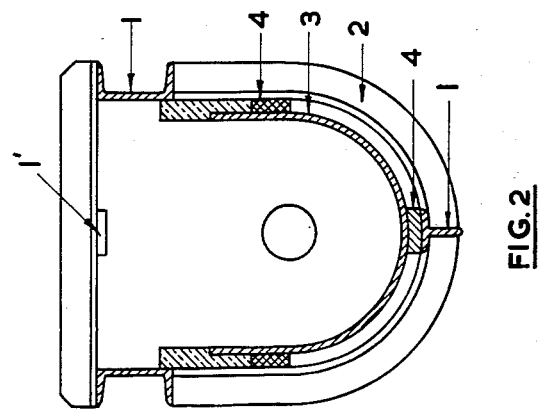
*Inventor*
BERNARD RAISTRICK
By Cushman, Darby & Cushman
*Attorneys*

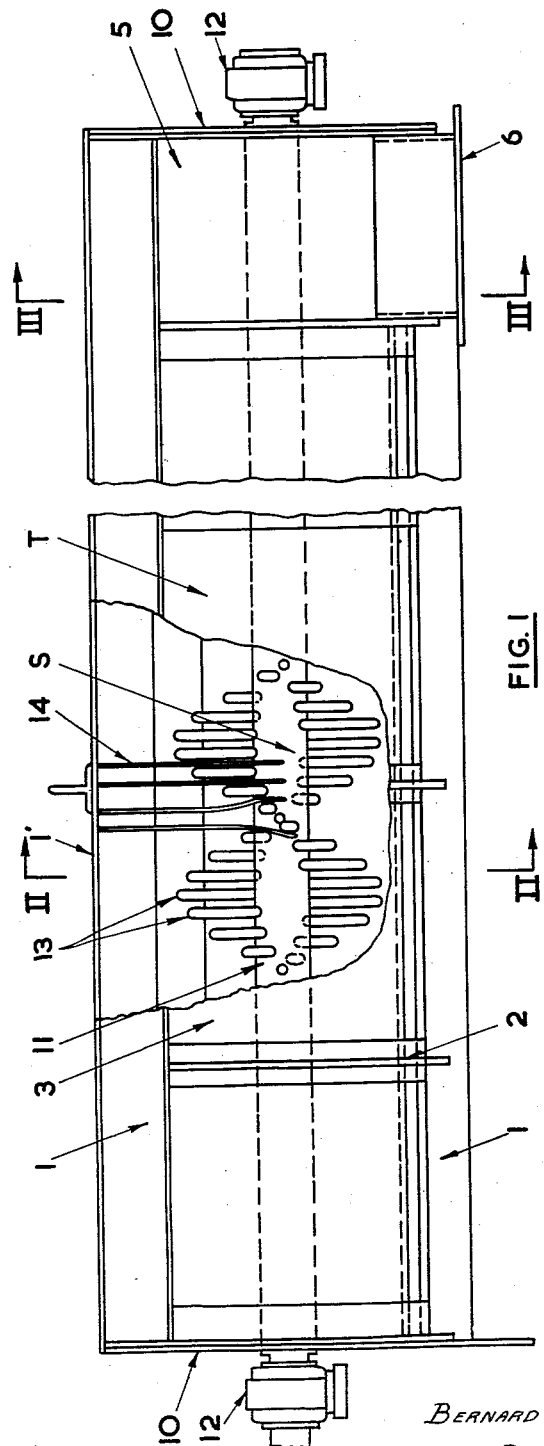

United States Patent Office 3,011,876
Patented Dec. 5, 1961

3,011,876
APPARATUS FOR GRANULATING FERTILIZER MATERIAL

Bernard Raistrick, Edinburgh, Scotland, assignor to Scottish Agricultural Industries Limited, Edinburgh, Scotland, a corporation of Great Britain
Filed July 2, 1957, Ser. No. 669,610
Claims priority, application Great Britain Oct. 5, 1956
1 Claim. (Cl. 23—259.1)

This invention relates to a process and apparatus for granulating materials. It is applicable to materials consisting of or containing one or more substances which are either water soluble or possess a degree of plasticity, in particlar to mixed fertilisers.

Previous practice in the granulation of such materials has been to agitate the moistened materials in a paddle mixer, pan mixer or rotary mixer until the desired degree of granulation is reached, the product then being sometimes dried in a rotary drier. The amount of water (in any form) which is used to moisten the material to be granulated is an important factor, not only from the point of view of its effect on the texture of the product but also from economic considerations because the water which is added often has to be removed by a drying procedure.

There are several ways of exercising water economy in granulation, such as the use of steam or by causing an exothermic chemical reaction to take place during the granulation: this invention provides another way of effecting water economy.

We have now found that granulation can be carried out more efficiently and with the use of less water than in known processes if the solid material to be granulated is agitated in a high speed pin granulator whilst water is added to it. The water may be added as such, or in the form of a solution of a desired ingredient or substance beneficial to granulation, or a slurry.

In addition to these advantages we have found that it is possible to process at relatively high granulation efficiency certain fertiliser mixtures which previously could not be formed into granules at all, or could only be handled by processing with a relatively high ratio of recycled material of product size or near-product size. Examples of such mixtures include some highly ammoniated fertilisers, others which contain a large proportion of recycled fine material and some mixtures composed wholly or substantially of soluble salts such as potassium chloride, ammonium sulphate or ammonium phosphate.

The pin granulator comprises essentially a trough along the longitudinal axis of which is a rotatable shaft carrying a series of pins set radially with their tips just clear of the walls of the trough and arranged around the shaft in helical fashion so that rotation of the shaft propels the material along the trough. Preferably the clearance between the tips of the pins and the trough wall is not more than half an inch.

The mechanism of granulation is probably that the agitation is so violent and the agglomeration process so quick in the high speed pin granulator that the water has not time to diffuse fully into each of the particles before they are agglomerated, hence less water is necessary than the other processes in which each of the particles is more fully soaked before they agglomerate.

An important factor affecting the granulation efficiency is the rate of movement of the pins. This should be such that the material is not merely stirred up whilst it lies in the lower part of the trough but is also carried up and agitated by the pins as they traverse the upper part of the trough above the rotating shaft. The optimum rotation speed of a shaft in a trough 17½" diameter is in the range of 80 to 100 r.p.m. which is equivalent to a peripheral speed for the pin tips of approximately 7 ft./sec. However, satisfactory granulation is obtained with a pintip speed within the range 4 to 9 ft./sec.

The pins are preferably made with specially hardened tips, otherwise the abrasive action of some materials, e.g. fertilisers, would be such that pins made of ordinary steel would wear down very rapidly and the greatly increased clearance between the tips and the trough would result in the characteristic granulating action being impaired.

The efficiency of granulation can be increased by the use of one or more of the following improvements to the basic apparatus.

The rotation of the pins throws the moistened material against the walls of the trough, this causes a layer of damp or wet material to build up on the walls of the trough. The tendency to formation of this stagnant layer is reduced if the trough is constructed of some flexible material, such as rubber. With this construction the inherent vibrations in the apparatus will vibrate the flexible trough and cause the trough wall to flex thus helping to break down any layer formation.

The use of pins rather than paddles in this apparatus removes the possibility of the formation of oversize caused by the build-up of the material on the paddle blades, but with certain mixtures the spaces between adjacent pins are inclined to web over as a result of build-up of material, initially on the inner and therefore slower-moving parts of the pins. There are three methods of preventing or reducing this effect.

(1) By the use of a series of flexible "tails," i.e. lengths of flexible material, attached to the walls or lid of the trough so as to dangle between the pins. As the pins rotate, the tails flick about and strike the pins and hence keep them clean. Abrasion-resistant rubber is preferred, but other materials such as wire or plastics can be used for the flexible tails.

(2) By the use of a material which is resilient and/or possesses a smooth continuous surface to coat the pins. Suitable materials are rubber and polythene.

(3) By the action of a series of loose rings round the shaft between the pins.

A granulator suitable for use in the process of the present invention is illustrated in the accompanying drawings in which FIG. 1 is an elevation in part section, FIG. 2 is a cross section on the line II—II of FIG. 1 and FIG. 3 is a cross section on the line III—III of FIG. 1.

The granulator comprises a U-section trough T in which is mounted longitudinally a stirrer S. The trough T is constructed basically on a framework of longitudinal members 1 and U-shaped connecting ribs 2. At the top the framework is 12'3" long and 1'6" wide. The major part of the trough is provided by a length of flexible rubbery material 3, suitably conveyor belting, which is flexibly supported in the framework on soft rubber cushions 4 to provide a trough of U-section 1'6" deep. (See FIG. 2.) The remaining section of the trough, which is the outlet end, comprises a mild steel casing 5 of U-shaped section having a discharge orifice 6 in the lower or bottom part. The walls are lined with flexible sheet material 7, conveniently conveyor belting, which may be flexed by clearing pins 8 slidably mounted in sleeves 9 secured to the casing 5. (See FIG. 3.) The ends of the trough are closed by end plates 10.

The rubbery material 3 forming the first part of the trough is constrained only around the edges where it is secured to the framework and to the casing 5 and consequently it may flex freely.

The stirrer S comprises a rotatable shaft 11 which passes through the end plates 10 of the trough and is mounted in bearings 12. The shaft, which is 14'9" long and 4" diameter, was drilled with ½" holes perpendicular to its long axis. Each hole was 11°15' to the next, and set ¾" apart, forming a spiral of holes. Mild steel pins 13 with tips of tungsten carbide were tacked-welded into the holes, facing alternate sides, so that there are in effect two spirals of pins running down the shaft. Because of the alternation of sides, each pin is actually spaced 1½" down the shaft from its neighbour, at an angle of 22°30'. The effective mixing length is 10'. Suspended between the pins 13 from longitudinal member 1 is a series of rubber strips or tails 14 (of which only a few are shown in FIG. 1).

Water is distributed over the solids at the entry end of the trough from two pipes located 6" and 12" from the material feed entry.

FIG. 4 is an enlarged longitudinal section of a pin 13 which has been coated with a layer of rubber 17 to reduce the tendency of material to cake and build up on the pin. The figure also shows in detail a preferred method of reducing the wear on the pin tip by fitting an insert 16 of abrasion-resistant material such as tungsten carbide.

FIG. 5 illustrates a further embodiment of the invention in which build-up of material on the shaft 11 and pins 13 is prevented by the use of loose rings 15 threaded on the shaft between the pins. As the shaft revolves the rings dislodge any caked material with which they come into contact.

EXAMPLE 1

In the use of the apparatus shown in FIG. 1 to granulate a NPK fertiliser the mixer shaft was rotated at 100 r.p.m. A mixture of recycled fines, superphosphate, ammonium sulphate and potassium chloride was fed in at a rate of 10 tons/hour and water was distributed over the agitated mixture at a rate of 21 gal./hour. The granules discharged from the mixer were then dried in a rotary drier. As the shaft rotated, the rubber tails flicked about between the pins and dislodged any material which would have caked thereon.

Table I shows the granulation efficiency (defined as the percentage of ex drier material in the 1–3.4 mm. range 16–5 mesh B.S.S.) of the high speed pin granulator compared with that of a tube granulator.

*Table I*

SIEVE ANALYSIS OF PRODUCTS EX DRIER USING A PIN GRANULATOR AND TUBE GRANULATOR

| Method of granulation | Average sieve analysis Mesh B.S.S. | | |
|---|---|---|---|
| | <16 | 16–5 | >5 |
| Pin granulator | 15 | 60 | 25 |
| Tube granulator | 14 | 41 | 45 |

The desired product size was 16–5 mesh, and the figures show that there is a significant increase of the percentage of this size in the product using the pin granulator.

EXAMPLE 2

A pin granulator similar to that described in Example 1 and used under similar conditions was used to obtain comparable figures for the water required to give efficient granulation of a range of superphosphate based fertilisers.

The water requirement, before the pin granulator was introduced to the system of granulation and when only a tube granulator was used, was on an average 33.4 gal./ton of product. The introduction of the high speed pin granulator reduced this requirement to 20.1 gal./ton.

EXAMPLE 3

This example further illustrates the improvements gained by incorporating a pin granulator into a granulation system. A conventional granulation plant, which included a tube conditioner was used to granulate a NPK fertiliser (11:11:11 containing superphosphate, ammonium phosphate, ammonium sulphate and potassium chloride) in run A. This run was carried out so that a maximum production rate was achieved without exceeding the maximum throughput of the drier (12–13 tons/hr.). The running conditions for run A are recorded in Table II.

A pin granulator, as shown in FIG. 1 was brought into circuit for run B. The rate and composition of the feed to the pin granulator in run B were arranged to be the same as those to the conditioner in run A (5 tons/hr. raw materials, 3 tons/hr. recycled fines). The conditions in run B are quoted in Table II.

*Table II*

GRANULATION OF A NPK FERTILISER (11:11:11)

| Condition | Run A | Run B |
|---|---|---|
| Oversize recycled to drier, tons/hr | 5 | 2 |
| Fines recycled to granulation system | 3 | ¹ 2 |
| Product off-take, tons/hr. (Granule size, 1–3.4 mm.) | 5 | 6 |
| Water usage, gal./hr | 270–300 | 170–185 |
| Water usage, gal./ton of product | 54–60 | 23–31 |
| Granulation efficiency | 39 | 60 |

¹ In run B it was necessary to take additional fines from the stock which had been produced during other runs in order to maintain the same feed in both runs.

The granulation efficiency in this case is defined as the percentage of material ex drier which is taken off as product in the size range 1–3.4 mm.

The production rate in run A was at a maximum because of the limit imposed by the drier capacity, but in run B a greater production rate could have been achieved if the feed to the pin granulator had not been fixed for comparison purposes at 8 tons/hr.

EXAMPLE 4

In another trial a conventional granulation plant which included a tube conditioner was used to granulate a 12:12:18 fertiliser. The phosphate content of this fertiliser was based solely upon ammonium phosphate. In run C granulation was effected by a tube conditioner whereas in run D a pin granulator was included in the circuit. The feed to the granulation apparatus in both runs was 4 tons/hr. raw materials, 2 tons/hr. fines. The running conditions in runs C and D are given in Table III.

*Table III*

GRANULATION OF A NPK FERTILISER (12:12:18)

| Condition | Run C | Run D |
|---|---|---|
| Oversize recycled to drier, tons/hr | 3 | 2½ |
| Fines recycled to granulation system | 2 | ¹ 1½ |
| Product off-take, tons/hr. (Granule size, 1–3.4 mm.) | 4 | 4½ |
| Water usage, gal./hr | 160–180 | 130–160 |
| Water usage, gal./ton of product | 40–45 | 29–36 |
| Granulation efficiency | 44 | 53 |

¹ In run D it was necessary to take additional fines from the stock which had been produced during other runs in order to maintain the same feed in both runs.

The granulation efficiency in this case is defined as the percentage of material leaving the drier which is taken off as product in the size range 1–3.4 mm.

The two main advantages of the high speed granulator are illustrated by this and the previous examples. They are (a) the higher granulation efficiency and (b) the lower water consumption and hence a reduction in the amount of water which has to be removed on drying the product.

I claim:

An apparatus for agglomerating a fertilizer material containing a water soluble component comprising a frame, a resilient trough supported by said frame, an agitator having a central shaft supported by said frame, and annularly and axially-spaced pins coated with a resilient material extending from said shaft to near said trough, means for rotating said shaft, means for introducing fertilizer into said trough, means for adding aqueous fluid to the fertilizer, means for withdrawing fertilizer granules from said trough, and strips of flexible material suspended between said pins from said frame to remove cakes of fertilizer material and reduce their formation.

References Cited in the file of this patent

UNITED STATES PATENTS

| | | |
|---|---|---|
| 338,121 | Wallace | Mar. 16, 1886 |
| 1,703,956 | Royer | Mar. 5, 1929 |
| 1,767,376 | Kramer | June 24, 1930 |
| 2,121,633 | Hartman et al. | June 21, 1938 |
| 2,136,793 | Gabeler et al. | Nov. 15, 1938 |
| 2,306,698 | Heller | Dec. 29, 1942 |
| 2,630,301 | Lentz | Mar. 3, 1953 |
| 2,726,852 | Sommer | Dec. 13, 1955 |
| 2,739,886 | Facer | Mar. 27, 1956 |